No. 638,094. Patented Nov. 28, 1899.
P. J. CASE & J. O. MAYHALL.
TRUCK FOR DRIVING UP CREEPING RAILWAY RAILS.
(Application filed July 11, 1899.)
(No Model.)
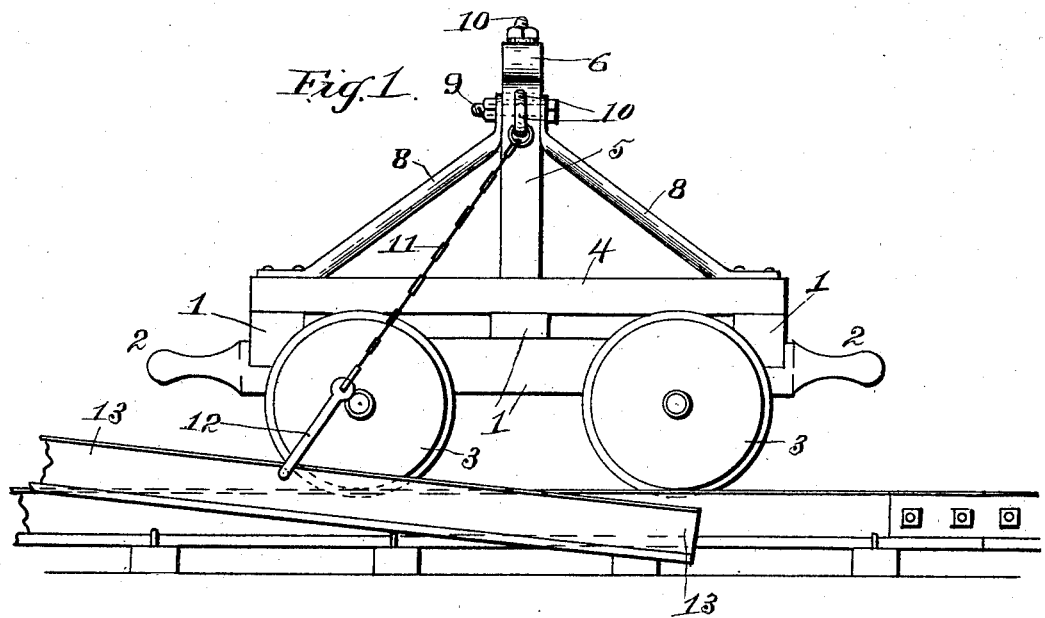
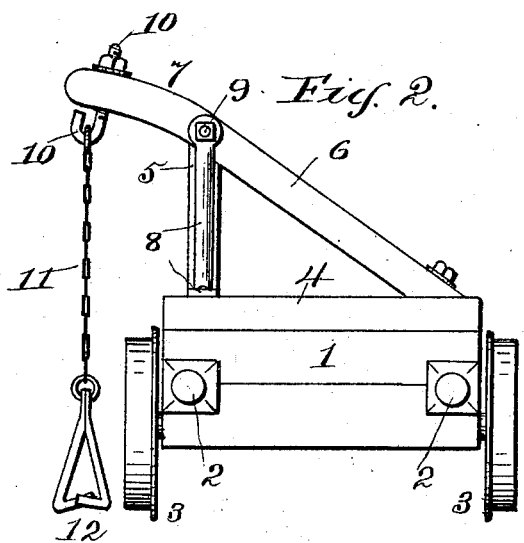
Witnesses.
C. T. Belt
Joseph F. Kelly
Inventors.
Perry J. Case
John O. Mayhall,
By W. H. Wills,
Attorney.

UNITED STATES PATENT OFFICE.

PERRY J. CASE AND JOHN O. MAYHALL, OF ROXIE, MISSISSIPPI.

TRUCK FOR DRIVING UP CREEPING RAILWAY-RAILS.

SPECIFICATION forming part of Letters Patent No. 638,094, dated November 28, 1899.

Application filed July 11, 1899. Serial No. 723,472. (No model.)

*To all whom it may concern:*

Be it known that we, PERRY J. CASE and JOHN O. MAYHALL, citizens of the United States, residing at Roxie, in the county of Franklin and State of Mississippi, have invented certain new and useful Improvements in Trucks for Driving Up Creeping Railway-Rails, of which the following is a specification.

This invention relates to railway hand-trucks, and has for its object to provide such trucks with means for driving up creeping railway-rails.

The invention consists in providing a truck used in laying or repairing railways with a derrick having a depending grapple to hold a driver and adapted to be swung longitudinally at the side of the truck. As a driver we prefer to use a rail or a piece of a rail, which is ordinarily carried by such trucks in repairing or laying railways, though other drivers capable of being held by the grapple may be employed.

In the accompanying drawings, forming part of this application, Figure 1 is a side elevation of a truck having our invention in position for operation. Fig. 2 is an end view of Fig. 1 without the driver and rails.

The same numeral references denote the same parts throughout the two views of the drawings.

The truck has the usual frame 1, handles 2, wheels 3, and bed 4. The derrick consists of a vertical standard 5, projecting from the bed 4 at one side edge of the latter, a beam 6 having one end secured to the bed near the other side edge and inclined upward over the top end of the standard 5, where it is secured, so as to leave its other end projecting from a bend 7 over and beyond the edge of the bed nearest the standard 5. A brace 8 is secured to the beam 6 upon each side thereof by a bolt 9, the other end of the said braces being secured to the bed 4. The overhanging end of the beam 6 is provided with a hook-bolt 10, from which depends a chain 11, having a grapple 12. This chain and the grapple are made to hang clear of the truck bed and wheels by the projecting end of the beam 6, so that the rail 13, which is employed as the driver, may be operated clear of the truck and its wheels.

In closing up an interval or space between two rails caused by the creeping of them the truck is run to a point on the track formed by said two rails and braked at a proper distance away from the said interval or space to permit the driver to be swung in the grapple longitudinally. The driver is then swung and guided at one end to make the other end strike a fish-plate on one of the creeping rails and drive it up flush with the adjoining rail, thus closing up the said interval or space.

We do not wish to be understood as limiting ourselves to any particular truck in the application of our invention nor to the size or material comprising the several parts of the same.

Having thus described our invention, what we claim as new, and desire to secure by Letters Patent, is—

The combination, with a railway hand-truck, of the standard secured to the truck-bed in vertical position, the beam having one end secured to the bed and inclined upward over the top of the said standard, the other end being bent and extending over the side of the truck, braces extending from the said beam to the bed, a chain depending from the said bent end of the beam, and a grapple carried by the chain and adapted to hold a suitable driver so that the latter may be swung longitudinally, substantially as and for the purpose set forth.

In witness whereof we hereunto set our hands in the presence of two witnesses.

PERRY J. CASE.
JNO. O. MAYHALL.

Witnesses:
T. M. MARSALIS,
E. B. SEALE.